3,003,867
PROCESS FOR RECOVERY OF NIOBIUM
Bernard J. Lerner, Pittsburgh, Pa., assignor to Gulf Research & Development Company, Pittsburgh, Pa., a corporation of Delaware
No Drawing. Filed May 22, 1959, Ser. No. 814,949
16 Claims. (Cl. 75—121)

This invention relates to the recovery of niobium from ores containing the same.

The element niobium, also commonly referred to as columbium, occurs in a great variety of ores. The commercial value of niobium in metallurgy makes desirable its recovery in relatively concentrated form from ores containing it including the low grade ores which contain only relatively small quantities of the metal. To accomplish recovery of the desired niobium metal it is necessary to decompose the mineral ore and convert the niobium to a form in which it can be separated from the other undesired constituents of the ore.

In the prior art certain niobium containing ores, generally ores of the columbite-tantalite type, are roasted at temperatures on the order of 600–800° C. to convert the niobium compounds to acid-susceptible oxides. The roasted materials are then treated with strong mineral acids such as concentrated sulfuric at high temperatures to effect decomposition of the oxides. The columbite-tantalite type ores are generally readily concentrated by standard physical methods to yield concentrates containing relatively high amounts of niobium. These concentrates are ordinarily subjected to the treatment with sulfuric acid. In addition to the columbite-tantalite type ores in which the niobium occurs as a niobate, the element niobium occurs in a number of other ores such as for example, the pyrochlore, koppite and niocalite type ores. These ores usually contain appreciable quantities of alkaline earth metals such as calcium and magnesium together with varying amounts of niobium depending upon the quality of the ore. Moreover, the niobium in these ores occurs not as a simple niobate but as complex basic salts such as the oxy-halides. Typical low-grade ores of the pyrochlore type may contain for example, from 2 to 20 percent calcium and from 0.05 to 1 percent niobium. High quality ores or concentrates would, of course, contain higher percentages of the niobium. The use of concentrated sulfuric acid in the decomposition of this type of ore results in excessive acid consumption. In the process of decomposing the ore, the concentrated sulfuric acid reacts with the calcium or other alkaline earth metals present therein to form large quantities of sulfate salts. The sulfate salts formed, such as calcium sulfate, are highly soluble in concentrated sulfuric acid at elevated temperatures. However, upon cooling the acid solution the sulfate salts precipitate producing a thick cementitious paste or gel which presents considerable difficulty in handling and which also prevents efficient separation and recovery of sulfuric acid. Because of the large bulk of material to be treated in the case of low grade ore, particularly ores containing relatively large quantities of alkaline earth metals, it is of greatest importance to an economically sound process that reagent costs be minimized.

The present invention provides a process wherein niobium can be conveniently and economically separated from ores containing it. By the novel process of the invention ores containing relatively minor amounts of of niobium together with appreciable quantities such as for example 2 to 20 percent or more of alkaline earth metals are readily decomposed and the niobium converted to a reactive form in which it can be substantially quantitatively separated from other constituents of the ore with readily available reagents.

It has now been found that dilute sulfuric acid can be effectively employed to decompose ores containing niobium in association with alkaline earth metals and to render the niobium extractable with organic reagents. Digestion of the ores with dilute sulfuric acid decomposes the ore and permits the niobium to be separated therefrom without incurring the cost or handling disadvantages normally associated with the use of concentrated sulfuric acid.

The concentration of sulfuric acid employed for decomposing the niobium containing ores is an important feature of the invention. It has been found that sulfuric acid of a concentration as low as about 35 percent by weight can be employed to satisfactorily decompose the ores and to render the niobium therein extractable with organic leaching agents. While on the other hand, the use of sulfuric acid of concentrations appreciably above about 75 percent is to be avoided because of high acid consumption due to the fact that the concentrated sulfuric acid reacts with gangue constituents of the ore such as calcium or other allkaline earth metals with the formation of large quantities of the corresponding metal sulfates. Upon precipitation of the alkaline earth sulfates a proportion of the sulfuric acid is maintained within the precipitated mass of solids, thus resulting in additional acid loss. In general, the concentration of sulfuric acid employed for treating ores in accordance with the invention ranges from as low as about 35 percent by weight to as high as about 75 percent by weight. A preferred concentration range for the sulfuric acid is the range from about 50 to 75 percent by weight. The surprising discovery that dilute sulfuric acid is effective for decomposing the niobium mineralization in niobium containing ores leads to numerous processing advantages, foremost of which is the significant reduction in the amount of sulfuric acid consumed in treating such ores. The significant decrease in acid consumption obtained with dilute sulfuric acid is directly attributable to the reduction in secondary gangue attack.

In accordance with the invention, the niobium containing ores are digested with dilute sulfuric acid for a time sufficient to effect substantially complete decomposition of the niobium mineralization in the ores, this end being accomplished ordinarily in 0.25 to 4 hours. The amount of acid employed for digestion of the ore is such to provide an acid to ore ratio of from about 0.2:1 to 2:1 or higher by weight based on anhydrous acid content. In order to avoid dissolution of the niobium, particularly when employing higher acid to ore ratios, the sulfuric acid employed for digestion of the ore is saturated with niobium prior to use. Recycle acid already saturated with niobium is equally suitable in this respect. For most efficient digestion of the ore it is preferred that the ore be in a finely divided state. In general, the particle size of the ore should be within the range of from about $\frac{1}{60}$ of an inch to $\frac{1}{200}$ of an inch.

The digestion operation is effected at elevated temperatures, preferably at a temperature corresponding to the boiling point of the dilute sulfuric acid utilized for digestion of the ore. Thus, in general, the ore digestion is effected at temperatures ranging from about 110° C. in the case of 35 percent acid to about 185° C. in the case of 75 percent acid. The use of dilute sulfuric acid makes it possible to use lower temperatures during the digestion operation than is possible with concentrated sulfuric acid. The temperature required is lowered as much as 100° C. or more. To avoid exceeding the upper limit of acid concentration specified herein due to vaporization of the water content of the acid, the digestion operation can be conducted under reflux conditions or alternately makeup water can be added as required during the digestion. It will be appreciated that the acid to ore ratio, the acid concentration, temperature of digestion and time of digestion are interdependent variables which are susceptible to variation to accomplish decomposition of the niobium mineralization of the ore with maximum efficiency.

In order to maintain the amount of acid required for treating the ore at a minimum, it is advantageous prior to digestion with sulfuric acid to first process the ore to remove therefrom acid-decomposable or alkaline constituents such as carbonates, silicates and aluminates which are usually associated with such ores and which would consume large quantities of sulfuric acid. Such prior processing methods for the ores do not form a part of this invention. One preferred method for removing such acid-consuming constituents involves treating the ore with sulfur dioxide and is described in applicant's copending application Serial No. 795,129 filed February 24, 1959.

that the use of dilute sulfuric acid permits the digestion of such ores to be effected at considerably lower temperatures and results in a marked reduction in consumption of sulfuric acid. As compared with concentrated sulfuric acid, the secondary attack of dilute sulfuric acid on constituents of the ore other than the desired niobium is significantly reduced thus resulting in the use of less acid for decomposition of the ores. Moreover, with the use of dilute sulfuric acid the liquid decomposition solution or filtrate resulting from the ore digestion stage is such that it can be handled with ease and the sulfuric acid recovered therefrom.

The advantages of the invention are further illustrated by the following specific examples.

EXAMPLE I

To determine the degree of attack on gangue constituents of an ore by concentrated sulfuric acid a series of ten runs was made on a virgin pyrochlore ore using concentrated sulfuric (96 percent) at an acid to ore ratio of 5:1. The conditions employed in each run are shown in the table below:

Table I

| | Run Number | | | | | | | | | |
|---|---|---|---|---|---|---|---|---|---|---|
| | 1 | 2 | 3 | 4 | 5 | 6 | 7 | 8 | 9 | 10 |
| Average Mesh Size | 8-14 | 8-14 | 14-30 | 14-30 | 30-50 | 30-50 | 50-100 | 50-100 | 100 | 100 |
| Wt. Ore Charge | 20 | 20 | 20 | 20 | 20 | 20 | 20 | 20 | 20 | 20 |
| Percent Niobium in Ore Charge | 0.43 | 0.43 | 0.40 | 0.40 | 0.37 | 0.37 | 0.34 | 0.34 | 0.40 | 0.40 |
| Ml. Acid | 57 | 57 | 57 | 57 | 57 | 57 | 57 | 57 | 57 | 57 |
| Acid Concentration, percent | 96 | 96 | 96 | 96 | 93 | 96 | 96 | 96 | 96 | 96 |
| Time, min | 15 | 15 | 15 | 15 | 15 | 15 | 15 | 15 | 15 | 15 |
| Temperature, °C | 250 | 250 | 250 | 250 | 250 | 250 | 250 | 250 | 250 | 250 |
| Percent Weight Loss in Ore After Digestion | 22.5 | 21.0 | 23.5 | 23.0 | 33.5 | 32 | 34 | 25.5 | 43.4 | 42.5 |

After digestion of the ore is complete the liquid phase or decomposition solution is separated from the solid decomposition residue by filtration or other suitable means and washed with hot water to remove sulfuric acid and to convert the niobium compounds to a complexible form. If desired for economy, the decomposition solution can be recovered for further use. The feasibility of recovering the decomposition solution will depend upon the condition of the residual acid after treatment of the ore and the quantity of acid involved and can best be determined by the operator.

The solid digestion residue is then treated with an organic agent which will react with and leach the niobium from the digestion residue. A suitable leaching agent for this purpose is oxalic acid. However, other suitable leaching agents which can be employed for reaction with the niobium include the organic acids such as tartaric acid, citric acid or salts thereof. The quantity of the organic leaching agent employed should preferably be in excess of that required stoichiometrically to form a soluble complex with the niobium.

The niobium values are recovered from the leach solution by well known procedures, for example by heating the leach solution to effect hydrolysis and to precipitate the niobium values as a hydrate or by precipitation with a base such as ammonium hydroxide, sodium hydroxide and the like, wherein an insoluble hydrous niobium oxide precipitates. It is preferred to precipitate the niobium values with potassium hydroxide. Precipitation of niobium with potassium hydroxide results in the formation of potassium oxalate which reagent can be utilized directly for treating additional quantities of digested ore. The insoluble hydrous niobium oxide precipitate is filtered off from the solution, washed and if desired calcined. Substantially pure niobium oxide may thus be obtained.

The effect of sulfuric acid concentration on treating low grade ores containing small amounts of niobium together with relatively large quantities of alkaline earth metal compounds has been studied. It has been found

EXAMPLE II 50 grams of a pyrochlore ore ground to a particle size of 100 mesh were treated with sulfur dioxide as described in the copending application mentioned heretofore to remove carbonates and other alkaline constituents therefrom. The pyrochlore ore contained 0.31 percent niobium. After the pretreatment with sulfur dioxide the ore sample was washed, dried and weighed. The sample weighed 42 grams. This ore sample was then digested with 100 milliliters of concentrated sulfuric acid (96%) at a temperature of 250° C. for a period of one hour. The digested slurry was then filtered and the solid residue obtained in the filtration was washed consecutively with 100 milliliters of water, 100 milliliters of hot saturated oxalic acid solution and again with 100 milliliters of water. The residue was then dried and weighed. The dried residue then weighed 32.6 grams which indicated as a result of the acid treatment a weight loss of about 22.3 percent. The niobium content of the residue was now found to be 0.09 percent indicating that about 70 percent of the niobium was removed from the ore sample. The liquid filtrate obtained by filtration of the digested slurry contained appreciable quantities of sulfate salts which upon standing overnight precipitated from solution to form a thick non-flowing unworkable mass.

EXAMPLE III

A pyrochlore ore containing 0.45 percent niobium was ground to 100 mesh and pretreated as in Example II with sulfur dioxide to remove carbonates therefrom. After treatment with sulfur dioxide 454 grams of the ore was digested in a 2 liter flask for one hour with 900 milliliters of 52.8 percent sulfuric acid. The digestion was carried out under reflux conditions at a temperature of 128° C. Following digestion, the ore slurry was then filtered. The solid residue obtained by filtering was then washed with 1400 milliliters of hot water and leached with a hot saturated oxalic acid solution. Following the oxalic acid leach the residue was washed, dried and weighed. The weight of the dried residue was 426.4 grams which indicated as the result of the acid treatment a weight loss of 6.2 percent. The niobium content of the dried residue was found to be 0.06 percent which is equivalent to 80 percent removal of niobium. The acid filtrate obtained from filtration of the digested slurry upon standing overnight remained perfectly clear with no visible precipitation of solids.

EXAMPLE IV 26 grams of a virgin pyrochlore ore containing 0.78 percent niobium and ground to a particle size of 100 mesh were charged together with 40 milliliters of 52.8 percent sulfuric acid to a 250 milliliter Erlenmeyer flask. The ore was digested in the dilute sulfuric acid for one hour at a temperature of about 128° C. The digestion slurry was then filtered and the residue obtained in the filtration was washed consecutively with 30 milliliters of a solution of ammonium sulfate, 100 milliliters of water, 50 milliliters of hot saturated oxalic acid solution and again with 50 milliliters of water. The residue was then dried and weighed. The dried residue then weighed 19.2 grams which indicated as a result of the acid treatment a weight loss of only about 4 percent. The niobium content of the residue was now found to be 0.09 percent which indicated that about 94 percent of the niobium was removed from the ore sample.

As seen from data presented in Examples I and II treatment of the ores with concentrated sulfuric acid resulted in exceptionally high weight loss; in each case the loss of weight in the ore being over 20 percent of the total weight of ore. In contrast, the weight loss of the ores treated with dilute sulfuric acid in Examples III and IV was significantly lower. The additional weight loss of ore as a result of the treatment with concentrated sulfuric acid is attributable to the attack of the strong acid on gangue constituents of the ore and is a measure of the corresponding increase in acid consumption. It will be noted also that the dilute sulfuric acid employed in Examples III and IV in accordance with the invention renders the niobium content thereof readily extractable with readily available leaching agents while employing considerably lower digestion temperatures.

It will be appreciated from the foregoing that the invention provides a highly practical and inexpensive method of treating niobium containing ores.

The method of the invention is particularly suited for treating ores which contain niobium together with appreciable quantities of alkaline earth compounds, such as for example ores of the type exemplified by pyrochlore, koppite, niocalite, hatchettolite, microlite, betafite, perovskite and the like.

Those modifications and equivalents which fall within the spirit of the invention and the scope of the appended claims are to be considered part of the invention.

I claim:

1. In a process of treating ores containing niobium in association with alkaline earth metals with sulfuric acid to decompose the ore and to render the niobium extractable from the ore with organic leaching agents, the improvement which comprises, utilizing sulfuric acid of a concentration from about 35 to about 75 percent by weight.

2. In a process of treating ores containing niobium in association with alkaline earth metals with sulfuric acid to decompose the ore and to render the niobium extractable from the ore with organic leaching agents, the improvement which comprises utilizing sulfuric acid of a concentration from about 50 to about 75 percent by weight.

3. A process for recovery of niobium from an ore containing niobium together with alkaline earth metals which comprises digesting said ore with sulfuric acid of a concentration from about 35 to 75 percent by weight, separating the liquid and solid digestion products, treating the solid digestion product containing the niobium with an organic leaching agent reactable with the niobium to remove the niobium therefrom.

4. A process for recovery of niobium from an ore containing niobium together with alkaline earth metals which comprises digesting said ore with sulfuric acid of a concentration from about 50 to about 75 percent by weight, separating the liquid and solid digestion products, treating the solid digestion product containing the niobium with an organic leaching agent reactable with the niobium to remove the niobium therefrom.

5. A process for recovery of niobium from an ore containing niobium together with alkaline earth metals which comprises digesting said ore with sulfuric acid of a concentration from about 35 to 75 percent by weight and which is substantially completely saturated with niobium, separating the liquid and solid products of digestion, treating the solid digestion product containing the niobium with an organic leaching agent reactable with the niobium to remove the niobium therefrom.

6. A process for recovery of niobium from an ore containing niobium together with alkaline earth metals which comprises digesting said ore with sulfuric acid of a concentration from about 35 to 75 percent by weight and which is substantially completely saturated with niobium, separating the liquid and solid products of digestion, treating the solid digestion product containing the niobium with an organic acid reactable with the niobium to remove the niobium therefrom.

7. A process for recovery of niobium from an ore containing niobium together with alkaline earth metals which comprises digesting said ore with sulfuric acid of a concentration from about 35 to 75 percent by weight which is substantially completely saturated with niobium, separating the liquid and solid products of digestion, treating the solid digestion product containing the niobium with oxalic acid to remove the niobium therefrom.

8. A process for recovery of niobium from pyrochlore ore which comprises digesting the said ore with sulfuric acid of a concentration from about 35 to 75 percent by weight and which is substantially completely saturated with niobium, separating the liquid and solid products of digestion, treating the solid digestion product containing the niobium with an organic leaching agent reactable with the niobium to remove the niobium therefrom.

9. A process for recovery of niobium from an ore containing niobium together with alkaline earth metals which comprises digesting said ore with sulfuric acid of a concentration from about 35 to 75 percent by weight, separating the liquid and solid products of digestion, treating the solid digestion product containing the niobium with an organic acid solution to effect solution of the niobium, then precipitating the niobium out of the resulting solution by the addition of a base, and separating the precipitated niobium from the solution.

10. A process for recovery of niobium from an ore containing niobium together with alkaline earth metals which comprises digesting said ore with sulfuric acid of a concentration from about 50 to 75 percent by weight, separating the liquid and solid products of digestion, treating the solid digestion product containing the niobium with an organic acid solution to effect solution of the niobium, then precipitating the niobium out of the resulting solution by the addition of a base, and separating the precipitated niobium from the solution.

11. A process for recovery of niobium from an ore containing niobium together with alkaline earth metals which comprises digesting said ore with sulfuric acid of a concentration from about 35 to 75 percent by weight, separating the liquid and solid products of digestion, treating the solid digestion product containing the niobium with an oxalic acid solution to effect solution of the niobium, then precipitating the niobium out of the resulting solution by the addition of a base, and separating the precipitated niobium from the solution.

12. A process for recovery of niobium from an ore containing niobium together with alkaline earth metals which comprises digesting said ore with sulfuric acid of a concentration from about 35 to 75 percent by weight and which is substantially completely saturated with niobium, separating the liquid and solid products of digestion, treating the solid digestion product containing the niobium with oxalic acid solution to effect solution of the niobium, then precipitating the niobium out of the resulting solution by the addition of ammonium hydroxide, and separating the precipitated niobium from the solution.

13. A process for recovery of niobium from an ore containing niobium together with alkaline earth metals which comprises digesting said ore with sulfuric acid of a concentration from about 50 to about 75 percent by weight and which is substantially completely saturated with niobium, separating the liquid and solid products of the digestion, treating the solid digestion product with oxalic acid solution to effect solution of the niobium, then precipitating niobium out of the resulting solution by the addition of potassium hydroxide and separating the precipitated niobium from the solution.

14. A process for recovery of niobium from an ore containing niobium together with alkaline earth metals which comprises digesting the said ore with sulfuric acid of a concentration from about 35 to 75 percent by weight for 0.25 to 4 hours at a temperature corresponding to the boiling point of the sulfuric acid, the ratio of sulfuric acid to ore employed for digestion being in the range of from 0.2:1 to 2:1, separating the liquid and solid products of the digestion, treating the solid digestion product containing the niobium with an organic leaching agent to effect solution of the niobium, precipitating the niobium from the resulting solution by the addition of a base, and separating the precipitated niobium from the solution.

15. A process for recovery of niobium from an ore containing niobium together with alkaline earth metals which comprises digesting the said ore with sulfuric acid substantially completely saturated with niobium of a concentration of about 50 to about 75 percent by weight for 0.25 to 4 hours at a temperature corresponding to the boiling point of the sulfuric acid, the ratio of sulfuric acid to ore employed for digestion being in the range of from 0.2:1 to 2:1, separating the liquid and solid products of digestion, treating the solid digestion product containing the niobium with an organic leaching agent to effect solution of the niobium, then precipitating the niobium out of the resulting solution by the addition of a base, and separating the precipitated niobium from the solution.

16. A process for recovery of niobium from pyrochlore ore which comprises digesting the said ore with sulfuric acid of a concentration from about 35 to 75 percent by weight for 0.25 to 4 hours at a temperature corresponding to the boiling point of the sulfuric acid, the ratio of sulfuric acid to ore employed for digestion being in the range of from 0.2:1 to 2:1, separating the liquid and solid products of the digestion, treating the solid digestion product containing the niobium with an organic leaching agent to effect solution of the niobium, precipitating the niobium from the resulting solution by the addition of base, and separating the precipitated niobium from the solution.

References Cited in the file of this patent

UNITED STATES PATENTS

| | | |
|---|---|---|
| 2,259,396 | Schlecht et al. | Oct. 14, 1941 |
| 2,481,584 | Fowler | Sept. 13, 1949 |

OTHER REFERENCES

Mellor: Comprehensive Treatise on Inorganic and Theoretical Chemistry, volume 9, 1929, page 859.